United States Patent [19]
Olona

[11] Patent Number: 6,012,665
[45] Date of Patent: Jan. 11, 2000

[54] FISHING ROD ASSEMBLY HAVING A MOTOR OPERATED FISHING REEL

[76] Inventor: Gerald J. Olona, 4108 Hendrix NE., Albuquerque, N.Mex. 87110

[21] Appl. No.: 09/195,028

[22] Filed: Nov. 18, 1998

[51] Int. Cl.[7] .................................................. A01K 89/017
[52] U.S. Cl. .......................... 242/250; 242/253; 242/305; 242/323; 242/225; 43/21
[58] Field of Search .................................... 242/225, 250, 242/253, 305, 323; 43/21, 26.1

[56] References Cited

U.S. PATENT DOCUMENTS

| | | | |
|---|---|---|---|
| 3,116,892 | 1/1964 | Pickard | 242/250 |
| 3,126,166 | 3/1964 | Weinberg | 242/250 |
| 3,561,695 | 2/1971 | Wood . | |
| 3,932,954 | 1/1976 | Wyroski | 43/21 X |
| 3,979,081 | 9/1976 | Miyamae | 242/250 |
| 4,283,025 | 8/1981 | Whisenhunt | 242/250 |
| 4,378,652 | 4/1983 | Lindgreen | 242/250 X |
| 4,515,324 | 5/1985 | Barton . | |
| 4,598,878 | 7/1986 | Steffan . | |
| 4,784,346 | 11/1988 | Steffan . | |
| 5,088,657 | 2/1992 | Chen | 242/225 |
| 5,156,351 | 10/1992 | Cittadini | 242/250 |
| 5,556,047 | 9/1996 | Nanbu | 242/250 |
| 5,878,523 | 3/1999 | Wenzel | 242/225 X |

FOREIGN PATENT DOCUMENTS

| | | | |
|---|---|---|---|
| 833388 | 3/1970 | Canada | 242/225 |
| 897667 | 4/1972 | Canada | 242/250 |
| 1426103 | 6/1966 | France | 43/21 |
| 1822698 | 6/1993 | U.S.S.R. | 43/26.1 |

*Primary Examiner*—Donald P. Walsh
*Assistant Examiner*—Emmanuel M. Marcelo
*Attorney, Agent, or Firm*—Joseph N. Breaux

[57] ABSTRACT

A motor operated fishing reel comprising a base frame chassis. A bracket attaches the base frame chassis to a soft cushion rubber grip handle of a fishing rod having a detachable wrist strap. A spool is mounted in a rotatable manner within the base frame chassis. A fishing line is wound upon the spool and extends from a forward end of the base frame chassis. A crank handle assembly is mounted on one side of the base frame chassis for manually rotating the spool. An electric drive unit within the base frame chassis is for electrically rotating the spool. A drag control structure is for providing drag on the fishing line to catch a fish.

4 Claims, 5 Drawing Sheets

FISHING ROD ASSEMBLY HAVING A MOTOR OPERATED FISHING REEL

TECHNICAL FIELD

The present invention relates to electrically operated fishing reels and more particularly to a motor operated fishing reel. The motor operated fishing reel includes a base frame chassis having a manual crank handle that is additionally operated by an electric drive unit. The output of the electric drive unit can be varied. An electro mechanical system incorporating a current generator from a DC gear motor of the electric drive unit provides a drag element to wear the fish out. The degree of drag is adjustable by the user by positioning of a trigger control variable resistor.

BACKGROUND ART

Numerous electrically operated fishing reels have been provided in prior art. For example, U.S. Pat. Nos. 3,561,695 to Wood, Jr.; 4,515,324 to Baron; 4,598,878 to Stiffen; 4,784,346 to Stiffen; 5,156,351 to Cittadini; and 5,556,047 to Nanbu all are illustrative of such prior art. While these units may be suitable for the particular purpose to which they address, they would not be as suitable for the purposes of the present invention as heretofore described.

The Wood, Jr. U.S. Pat. No. 3,561,695 discloses an electric fly reel. An electric fly reel having a handle for rotating the spool in a conventional manner to reel in a fish and a miniature electric motor for rotating the spool with sufficient torque to reel in slack in the line. The motor is powered by a plurality of small pen cell batteries mounted on the reel.

The Baron U.S. Pat. No. 4,515,324 discloses a battery powered fishing reel. A portable hand held type fishing reel having a motor operably connected with the spool member of the reel for facilitating winding of the fishing line onto the spool without interference with the normal operation of the fishing reel, the motor being operably connected with a switch by a battery pack which may be remotely disposed with respect to the reel, a drive assembly connected with the spool member and selectively operable upon energization of the motor for winding of the line onto the spool, the drive assembly including a pivotal lever having a normal position wherein the drive connection between the motor and spool is disengaged and selectively movable to provide an engaged position between the motor and spool, the lever being particularly designed whereby the driving engagement between the motor and spool is achieved prior to energization of the motor to substantially preclude accidental damage of the engaged driving elements.

The Stiffen U.S. Pat. No. 4,598,878 discloses a motorized fishing reel. A rotatable drive output is provided for a fishing reel and has a connecting gear for establishing a rotatable connection between the fishing reel spool shaft and the drive output. This drive connection is provided at the end of the reel opposite from the manually operating handle and is operably connected to an electric motor mounted on the reel or in a remote location with a flexible cable drive. In some embodiments, a micro switch is mounted on the reel body and is associated with a manually operable pivotal lever capable of operating the switch in an arrangement which causes engagement of the gear output and connecting gear prior to closing of the switch. In another embodiment, a fish line spool of the reel is provided that is hollow and the electric drive motor is supported in the hollow portion of this spool.

The Stiffen U.S. Pat. No. 4,784,346 discloses a motorized fishing reel. A fishing reel body with a fish line spool has an electric motor assembly mounted thereon having a circuit operated by a control level. This lever extends between opposite ends of the reel body and has a finger engaging portion extending outwardly for manual engagement by a fisherman. The lever has a first position wherein the finger engaging portion extends outwardly radially from the fish line spool. This first position comprises a de-energized condition of the motor. The lever has a second position wherein the finger engaging portion is angled upwardly relative to its first position. The second position comprises a locked-on energized condition of the motor. The lever also has a third position wherein the finger engaging portion is angled downwardly relative to the first position. This third position comprises a manually held energized condition of the motor. A switch in the circuit and the motor assembly are arranged such that the drive output gear of the motor and a drive receiving gear of the fish line spool are engaged prior to closing of the switch.

The Cittadini U.S. Pat. No. 5,156,351 discloses an electric fishing reel. An electric fishing reel is disclosed, comprising a case whose wall has at least one opening through which passes a mechanical connection connecting at least one controlled member and one control member together, disposed respectively on each side of the wall, sealing means being provided for sealing the passage of the mechanical connection through the opening. According to the invention, the sealing means are formed by a piece of resilient deformable material providing at least a spring function for the mechanical connection.

The Nanbu U.S. Pat. No. 5,556,047 discloses a motor operated fishing reel. A motor output regulator for increasing and decreasing the output of a spool drive motor in multiple continuous stages is rotatably provided, in a motor-operated fishing reel equipped with a spool drive motor, on the same side of the reel body where a manual handle for manually driving the spool to rotate is installed. The direction in which the output of the motor is increased by the motor output regulator is set equal to the direction in which the fishing line is wound up onto the spool by the manual handle. The motor-operated fishing reel is excellent in operability in that while both sides of the reel body is gripped, the output of the motor can be made variable to adjust its speed. It is also possible to simultaneously perform both winding-up operation by the manual handle and speed change operation by the motor output regulator with a single hand.

GENERAL SUMMARY DISCUSSION OF THE INVENTION

Many elderly and handicapped people have problems fishing when faced with the task of reeling in a heavy fish, usually due to their physical condition. These physical conditions are amplified in cold weather, making it more difficult than usual for them to fish. The elderly and handicapped may have problems reeling in a large fish on their own, often times requiring the help of others in order to enjoy one of America's favorite past times, fishing. The motor operated fishing reel serves to solve this problem and provides a level of independence and enjoyment for the elderly and handicapped by providing a battery-powered, electric motor reel system that reels in fish using an electric motor. The motor operated fishing reel will allow the pleasure of reeling in a fish without the drudgery of using a mechanical hand crank.

A primary object of the present invention is to provide a motor operated fishing reel that will overcome the shortcomings of the prior art devices.

Another object is to provide a motor operated fishing reel that will fit on any standard rod mounting system, features a comfortable hand grip and function lever with an associated thumb control indent for easy application by the elderly and handicapped, which may be adapted for right or left hand use.

An additional object is to provide a motor operated fishing reel that utilizes a rechargeable battery, which is easily removed by the use of a pull ring, and a battery charger that charges a plurality of the batteries all at once, either through the use of ordinary house current or through a motor vehicle cigarette lighter adapter.

A further object is to provide a motor operated fishing reel that is simple and easy to use.

A still further object is to provide a motor operated fishing reel that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

Similar reference characters denote corresponding features consistently throughout the attached drawings.

EXEMPLARY MODE FOR CARRYING OUT THE INVENTION

Figure 1:
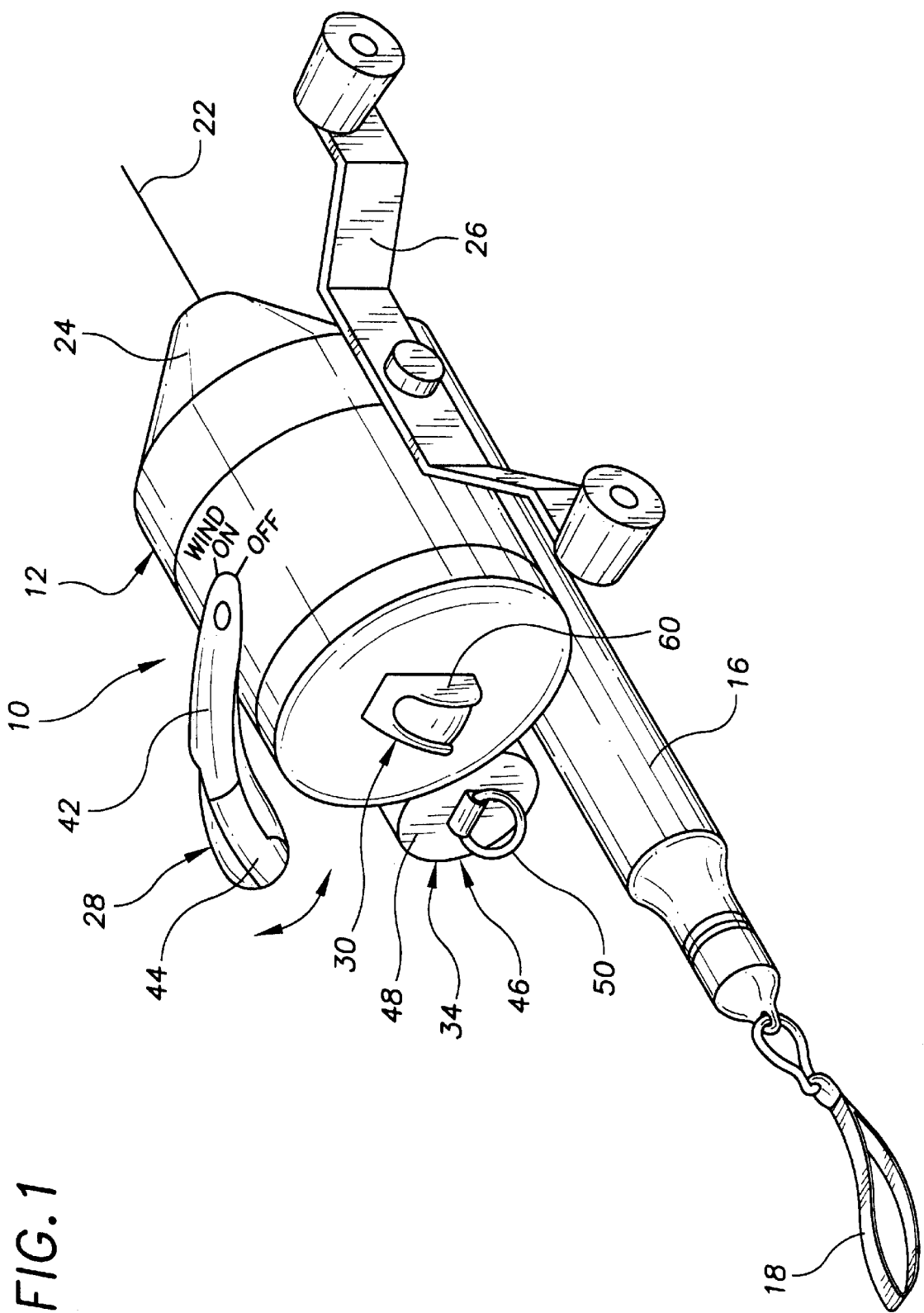
FIG. 1 is a perspective view of a first embodiment of the present invention.

Turning now descriptively to the drawings, in which similar reference characters denote similar elements throughout the several views, FIGS. 1 through 7 illustrate the various features of the present invention being a motor operated fishing reel 10 comprising a base frame chassis 12. A bracket 14 is for attaching base frame chassis 12 to a soft cushion rubber grip handle 16 of a fishing rod having a detachable wrist strap 18. Spool 20 is mounted in a rotatable manner within base frame chassis 12. A fishing line 22 is wound upon spool 20 and extends from a forward end 24 of base frame chassis 12. Crank handle assembly 26 is mounted on one side of base frame chassis 12 for manually rotating spool 20. Electric drive unit 28 within base frame chassis 12 is for electrically rotating spool 20. A drag control structure 30 is for providing drag on fishing line 22 to catch a fish.

Figure 2:
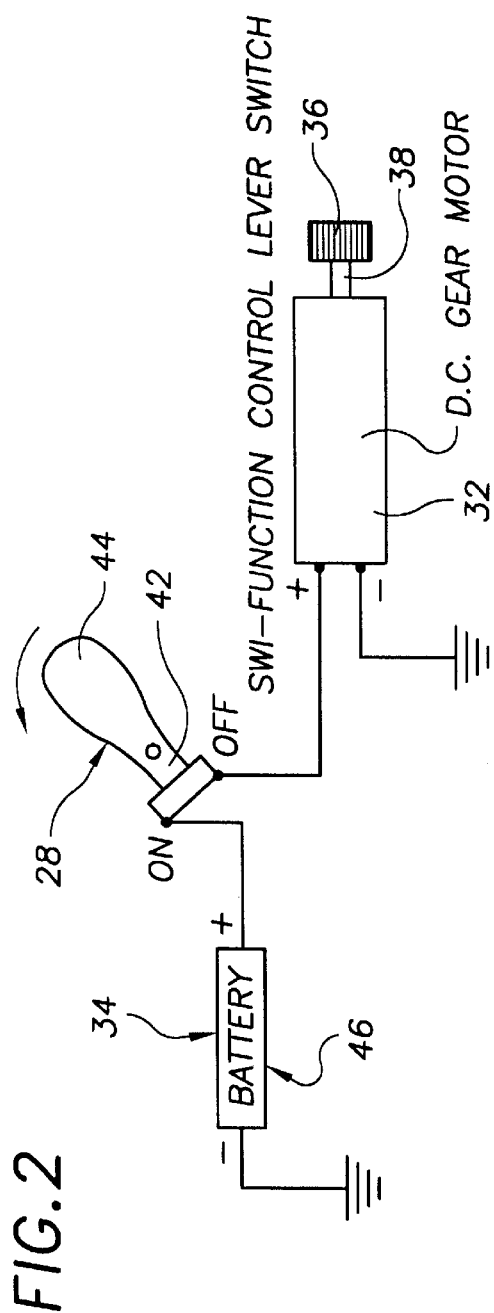
FIG. 2 is a schematic diagram of the electrical circuit of the first embodiment.
Figure 4:
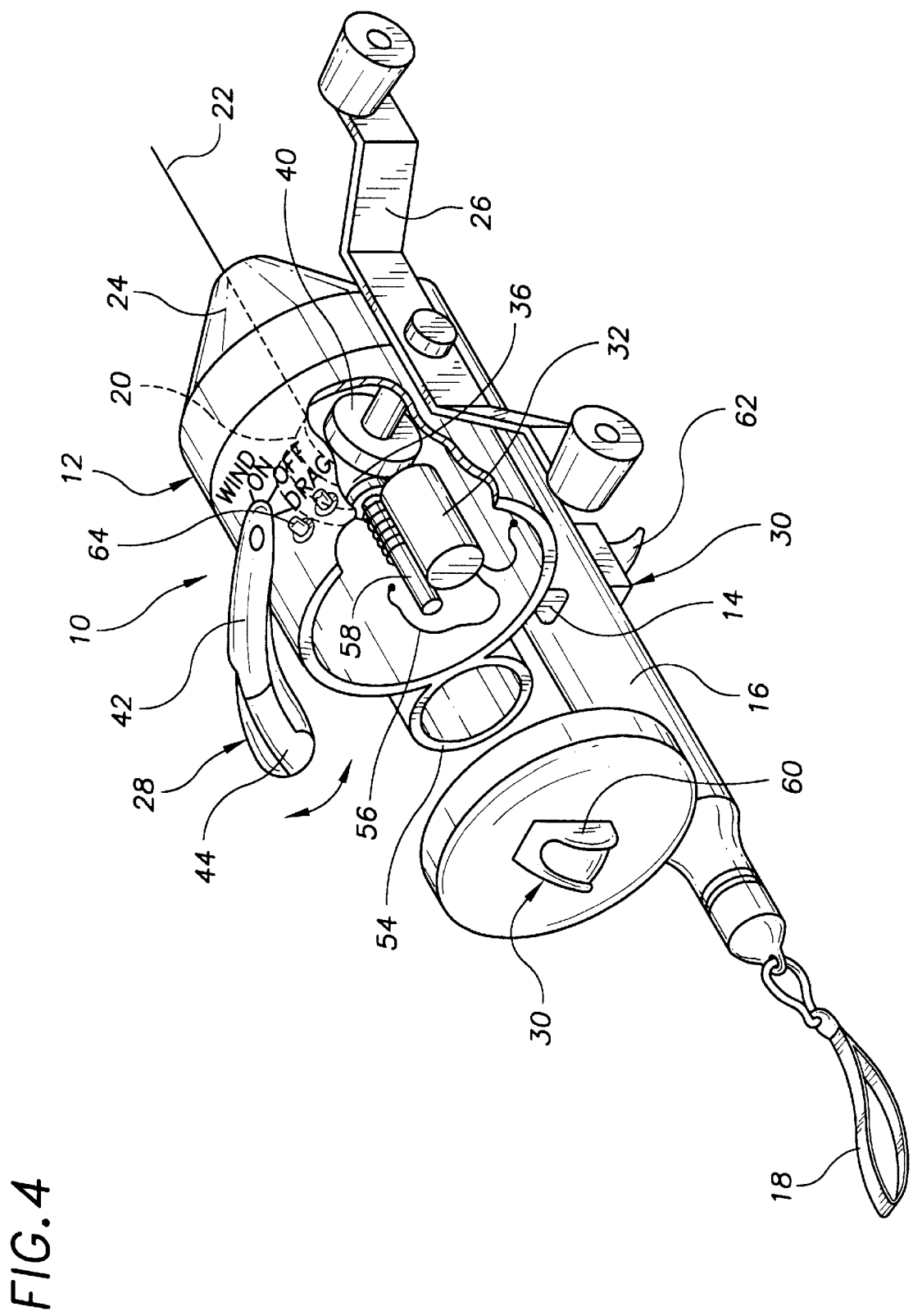
FIG. 4 is a partial exploded perspective view of the present invention with parts broken away, showing internal components of both the first and second embodiments.

Electric drive unit 28, as best seen in FIGS. 2 and 4, includes a DC gear motor 32. A power source 34 is for operating DC gear motor 32. Motor drive gear 36 is on output shaft 38 of DC gear motor 32. A slip clutch assembly 40 is coupled between crank handle assembly 26 and motor drive gear 36 to allow crank handle assembly 26 to slip if it hits an object. Function lever switch 42 with thumb control indent 44 is electrically connected between DC gear motor 32 and power source 34. Function lever switch 42 with thumb control indent 44 has two electrical positions, so as to turn DC gear motor 32 on and off.

Figure 6:
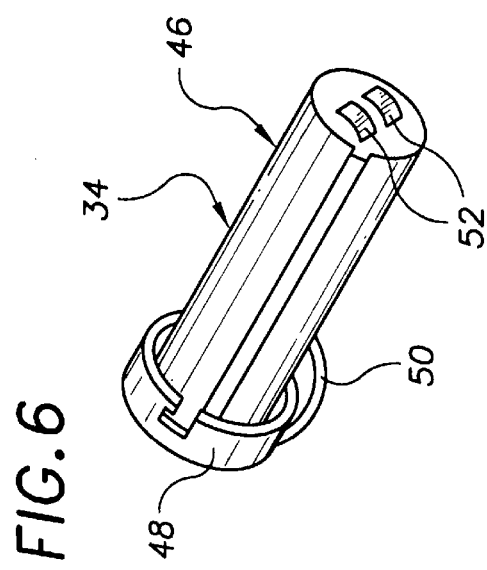
FIG. 6 is a perspective view of the rechargeable battery removed therefrom.

The power source 34, as best seen in FIG. 6, consists of a rechargeable battery pack 46 having a battery attachment cap 48 with pull ring 50 and a pair of electrical contacts 52. Rechargeable battery pack 46 can lock fit into a battery holder 54 on base frame chassis 12 and be electrically connected via power wire 56 to DC gear motor 32 (see FIG. 4).

Drag control structure 30, as shown in FIGS. 1 and 4, comprises a spring biased shaft 58 carried within base frame chassis 12 having a forward end adjacent to slip clutch assembly 40. A mechanical drag control lever 60 is provided, which when manually depressed will cause forward end of spring biased shaft 58 to engage with slip clutch assembly 40.

Figure 5:
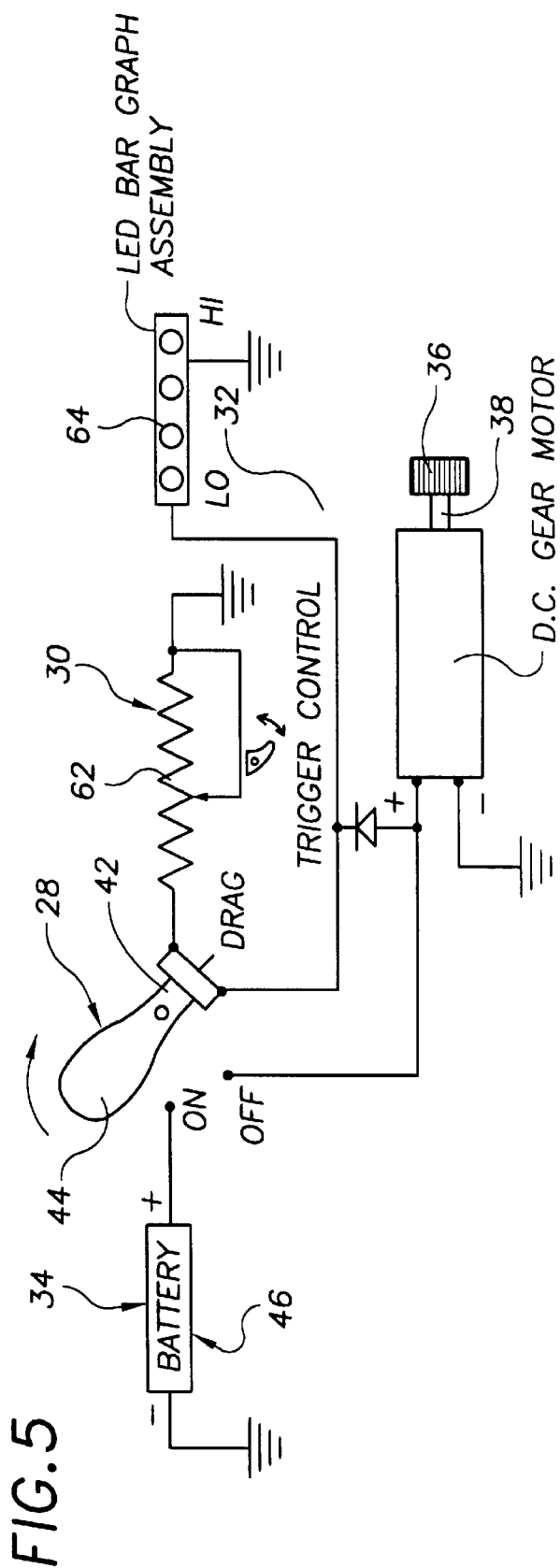
FIG. 5 is a schematic diagram of the electrical circuit of the second embodiment.
Figure 3:
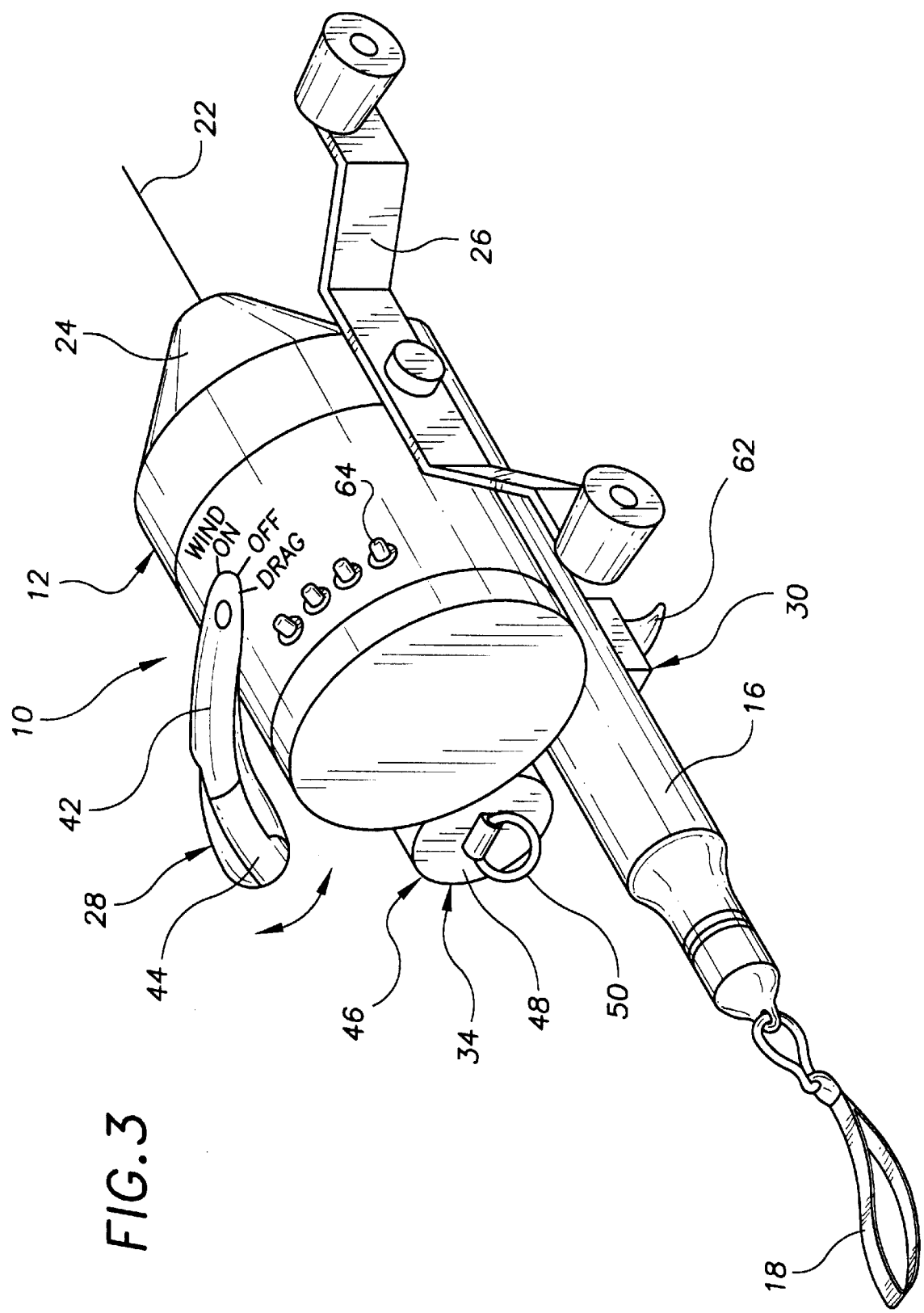
FIG. 3 is a perspective view of a second embodiment of the present invention.

Drag control structure 30, as shown in FIGS. 3, 4 and 5, consists of function lever switch 42 with thumb control indent 44 having a third electrical position to place DC gear motor 32 into a drag mode to function as an electrical generator. A trigger control variable resistor 62 and light emitting diode bar graph assembly 64 is electrically connected to the third electrical position. When trigger control variable resistor 62 is manually pulled back voltage is fed back across electrical leads of DC gear motor 32, which provides an electro mechanical drag on fishing line 22 and proper voltage to power the light emitting diode bar graph assembly 64.

Figure 7:
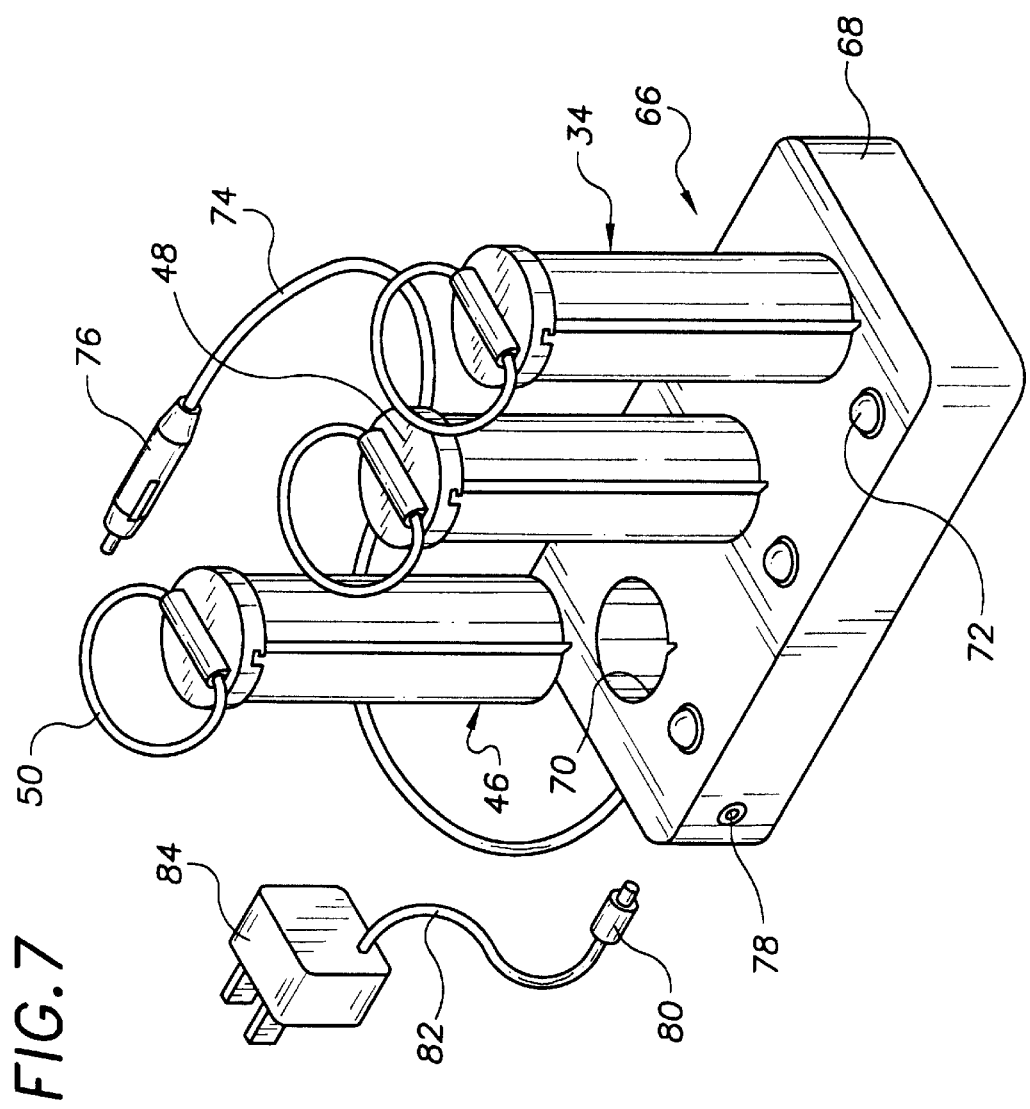
FIG. 7 is a perspective view of a battery charger.

FIG. 7 shows a battery charger 66 having a base 68 with a plurality of sockets 70 to receive rechargeable battery packs 46 therein. A plurality of light emitting diodes 72 are on base 68. Each light emitting diode 72 is electrically connected to each socket 70. Each light emitting diode 72 will illuminate when respective rechargeable battery pack 46 is recharging. An electrical cord 74 is electrically connected to sockets 70 and extends from base 68. A vehicle cigarette lighter adapter 76 is on a free end of electrical cord 72, so that rechargeable battery packs 46 may be recharged from a motor vehicle. Battery charge base 68 has a power pack outlet 78 electrically connected to sockets 70. A power pack plug 80 engages with power pack outlet 78. A power pack wire 82 is electrically connected at a first end to power pack plug 80. A DC power pack transformer adapter 84 is electrically connected to a second end of power pack wire 82, so that rechargeable battery packs 46 may be recharged from house current.

It can be seen from the preceding description that in use, motor operated fishing reel 10 is used as any conventional rod and reel system while fishing. In the event of a fish strike a user provides either mechanical drag (conventional version), or electro-mechanical drag (electro mechanical drag version with light emitting diode visual feedback) in order to keep the fish on fishing line 22 in contact with the hook. Once the drag function has been utilized, function lever switch 42 is easily moved to the on position, automatically reeling in the fish under the power of DC gear motor 32.

Once reeled in, function lever switch 42 is moved to the off position. When required, the user removes dead battery pack 46 from motor operated fishing reel 10 by disengaging battery attachment cap 48 and pulls the battery pack 46 from battery holder 54 using the convenient pull ring 50. The discharged battery pack 46 is placed in an empty socket 70 in base 68 of battery charger 66, while a freshly charged battery pack 46 is removed from battery charger 66 and placed in battery holder 54 of motor operated fishing reel 10. Battery charger 66 may be used either in a motor vehicle using cigarette lighter adapter 76, or in the home using wall mounted DC power pack transformer adapter 84. Motor operated fishing reel 10 not only provides convenience for those who fish, but also provides an easier and more convenient way for those who are handicapped or elderly to fish without the difficulty of manually winding up their fishing reel.

It is noted that the embodiment of the motor operated fishing reel described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing rod assembly having a motor operated fishing reel comprising:

a base frame chassis;

a bracket for attaching said base frame chassis to a soft cushion rubber grip handle of a fishing rod having a detachable wrist strap;

a spool mounted in a rotatable manner within said base frame chassis;

a fishing line wound upon said spool and extending from a forward end of said base frame chassis;

a crank handle assembly mounted on one side of said base frame chassis for manually rotating said spool;

electric drive means within said base frame chassis for electrically rotating said spool; and drag control means for providing drag on said fishing line to catch a fish;

said electric drive means including a DC gear motor, a power source for operating said DC gear motor, a motor drive gear on an output shaft of said DC gear motor, a slip clutch assembly coupled between said crank handle assembly and said motor drive gear to allow said crank handle assembly to slip if it hits an object and a function lever switch with thumb control indent electrically connected between said DC gear motor and said power source, said function lever switch with thumb control indent having two electrical positions, so as to turn said DC gear motor on and off.

2. The fishing rod assembly having a motor operated fishing reel as recited in claim 1, wherein:

said power source consists of a rechargeable battery pack having a battery attachment cap with pull ring and a pair of electrical contacts, so that said rechargeable battery pack can lock fit into a battery holder on said base frame chassis and be electrically connected via power wire to said DC gear motor.

3. The fishing rod assembly having a motor operated fishing reel as recited in claim 1, wherein:

said drag control means includes a spring biased shaft carried within said base frame chassis having a forward end adjacent to said slip clutch assembly and a mechanical drag control lever which when manually depressed will cause said forward end of said spring biased shaft to engage with said slip clutch assembly.

4. The fishing rod assembly having a motor operated fishing reel as recited in claim 1, wherein:

said drag control means includes said function lever switch with thumb control indent having a third electrical position to place said DC gear motor into a drag mode to function as an electrical generator, a trigger control variable resistor and a light emitting diode bar graph assembly electrically connected to said third electrical position, so that when said trigger control variable resistor is manually pulled back voltage is fed back across electrical leads of said DC gear motor, which provides an electro mechanical drag on said fishing line and proper voltage to power said light emitting diode bar graph assembly.

* * * * *